United States Patent
Soelberg et al.

(10) Patent No.: US 10,111,062 B2
(45) Date of Patent: Oct. 23, 2018

(54) COMMUNICATION SERVICE USAGE TRANSFER

(71) Applicant: AT&T MOBILITY II, LLC, Atlanta, GA (US)

(72) Inventors: Emily Soelberg, Atlanta, GA (US); Glenn Blumstein, Mercer Island, WA (US); Ginger Chien, Bellevue, WA (US); Murali Narayanan, Redmond, WA (US); Bradley Richard Ree, Cumming, GA (US); Venson Shaw, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 83 days.

(21) Appl. No.: 14/621,509

(22) Filed: Feb. 13, 2015

(65) Prior Publication Data

US 2016/0241721 A1 Aug. 18, 2016

(51) Int. Cl.
*H04M 15/00* (2006.01)
*H04W 4/24* (2018.01)

(52) U.S. Cl.
CPC ............ *H04W 4/24* (2013.01); *H04M 15/09* (2013.01); *H04M 15/46* (2013.01)

(58) Field of Classification Search
CPC .................................................. H04W 28/18
See application file for complete search history.

(56) References Cited

U.S. PATENT DOCUMENTS

| 8,139,564 | B1 | 3/2012 | Weaver et al. | |
| 8,526,426 | B2 | 9/2013 | Weaver et al. | |
| 2006/0014520 | A1 | 1/2006 | Anderson et al. | |
| 2007/0143486 | A1 | 6/2007 | Kang et al. | |
| 2012/0030102 | A1* | 2/2012 | Doehler | G06Q 20/10 705/40 |
| 2012/0082148 | A1* | 4/2012 | Sperling | G06Q 30/04 370/338 |
| 2014/0024339 | A1 | 1/2014 | Dabbiere et al. | |
| 2014/0036785 | A1 | 2/2014 | Li et al. | |
| 2014/0220927 | A1* | 8/2014 | Girard | G06Q 30/02 455/405 |
| 2014/0286199 | A1 | 9/2014 | Li et al. | |

* cited by examiner

*Primary Examiner* — Mazda Sabouri
(74) *Attorney, Agent, or Firm* — Baker & Hostetler LLP

(57) ABSTRACT

Systems, methods, and apparatuses may allow a host device to facilitate communication from a guest device to a network, wherein the service usage charges that would ordinarily be charged against the host device account may be transferred to the guest device account. A method may include a host device connecting to a network. The host device may be associated with a first account. The host device may receive a connection from a guest device. The guest device may be associated with a second account. The host device may facilitate communication from the guest device to the network, wherein the facilitated communication from the guest device to the network may be a charge against the first account. The host device may provide instruction to the network to transfer the charge against the first account to the second account.

20 Claims, 11 Drawing Sheets

COMMUNICATION SERVICE USAGE TRANSFER

TECHNICAL FIELD

The technical field generally relates to wireless communications and more specifically to service usage.

BACKGROUND

An agreement between a consumer and a communication service provider, such as an Internet service provider (ISP) or a wireless service provider, typically involves a limitation on the usage of the consumer. For example, the use of a cell phone may be limited in the number of minutes, texts, or amount of data used on the cell phone. Similarly, a home ISP subscriber may be limited in the amount of data downloaded to or uploaded from the subscriber's home network.

Many modern mobile devices are capable of wirelessly connecting to a second device, such as a wireless router or another mobile device, and take advantage of the connections of the second device to perform communication operations. For example, a guest with a smart phone may connect to a wireless router at a host's home and browse the Internet or stream a movie over the wireless router's Internet connection instead of over the smart phone's cellular connection.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

As an example, a device may include a processor and a memory coupled to the processor. The memory may have instructions that effectuate the operations of connecting with a network entity. The device may be associated with a first account associated with the network entity. The operations may also include connecting with a second device. The second device may be associated with a second account associated with the network entity. The operations may include facilitating communication from the second device to the network entity. The facilitated communication from the second device to the network entity may cause a charge against the first account. Additionally, the operations may include providing an instruction to the network entity to facilitate a transfer of the charge against the first account to the second account.

As another example, a system may include a first device and a network entity. The network entity may include a processor and a memory coupled to the processor. The memory may have instructions that effectuate the operations of receiving a request for a connection. The request may be indicative of being provided by the first device. The first device may be associated with a first account associated with the network entity. The operations may include receiving an account identifier from the first device. The account identifier may be associated with a second device connected to the first device. The second device may be associated with a second account associated with the network entity. The operations may additionally include providing a communication service to the second device. The communication service may be facilitated by the first device and may comprise a charge against the first account. The operations may include facilitating a transfer of the charge against the first account to the second account.

As another example, a method may include receiving, by a network entity, a request for a connection to the network entity. The request may be indicative of being provided by a first device. The first device may be associated with a first account associated with the network entity. The method may include receiving, by the network entity, an account identifier from the first device. The account identifier may be associated with a second device connected to the first device. The second device may be associated with a second account associated with the network entity. The method may include providing, by the network entity, a communication service to the second device. The communication service may be facilitated by the first device and may comprise a charge against the first account. The method may additionally include facilitating, by the network entity, a transfer of the charge against the first account to the second account.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION

As described herein, usage of a communication service by a guest device via a host device may be charged against the communication service account associated with the guest device instead of the account associated with the host device. For example, a guest device, such as a smart phone, may connect to the mobile hotspot of a host device, such as a second smart phone. The guest device may access a communication service, such as the Internet, through the connection with the host device. The guest device may then proceed to browse the Internet and thus incur data usage charges which would ordinarily count against the account associated with the host device. However, by utilizing the systems and methods of communication service usage transfer disclosed herein, the data usage incurred may be charged against the account associated with the guest device.

Figure 1:
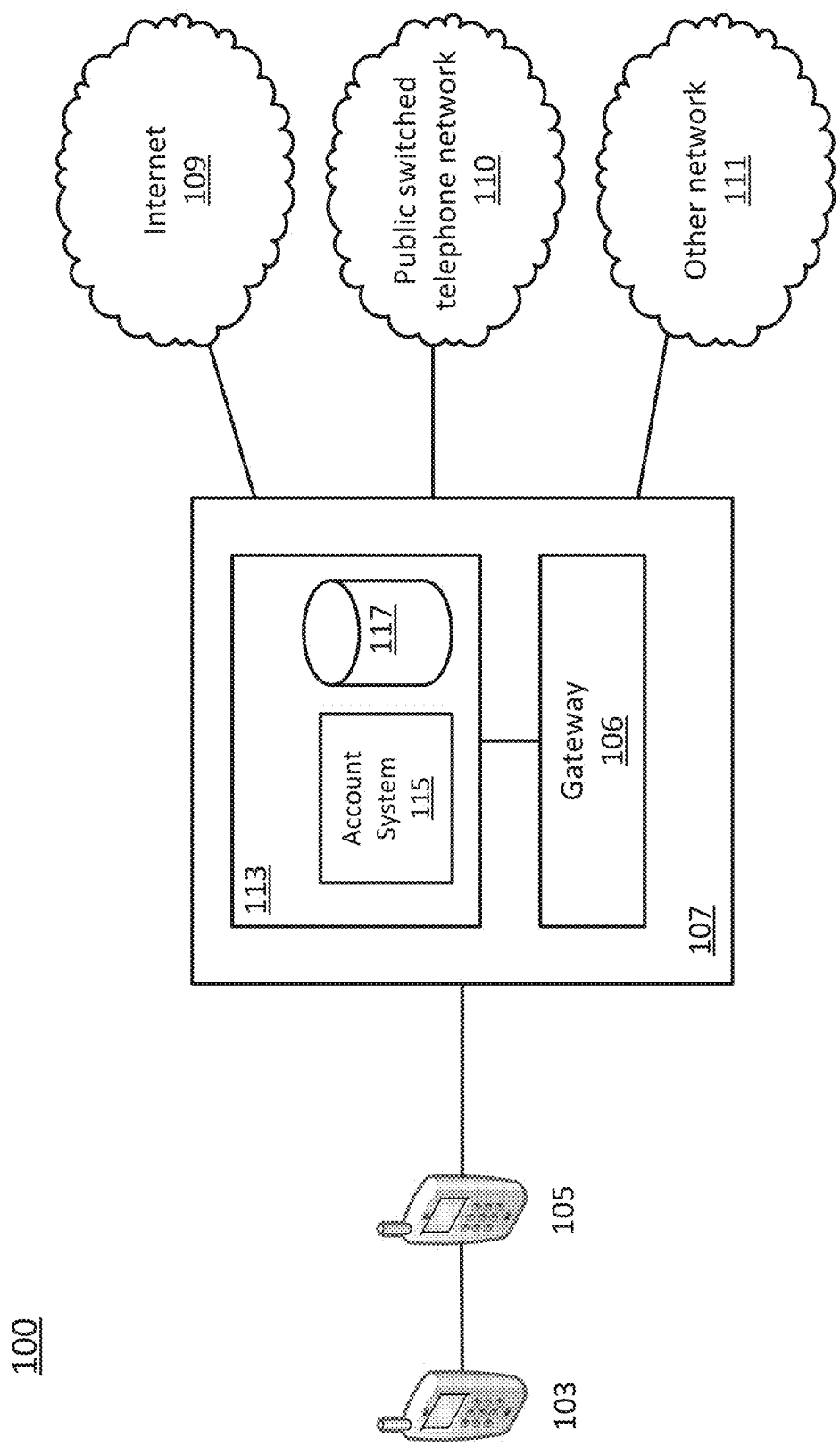
FIG. 1 illustrates an exemplary communication system which may be utilized to facilitate communication service usage transfer.

FIG. 1 illustrates an example communication system 100 in which one or more disclosed examples may be implemented. Connections within communication system 100 may be wireless or wireline. Communication system 100 may include a guest device 103, a host device 105, a communication service provider 107, and a network, such as an Internet 109, a public switched telephone network (PSTN) 110, or other network 111. The communication service provider 107 may include an account server 113 and a gateway 106. The disclosed examples contemplate any number of guest devices 103, host devices 105, communication service providers 107, gateways 106, account servers 113, and networks. The account server 113 may be communicatively connected to the gateway 106. The guest device 103 may be communicatively connected to a network via the host device 105 and the communication service provider 107, as discussed further herein. The host device 105 may be communicatively connected to a network via the communication service provider 107, also discussed further herein.

The guest device 103 or host device 105 may include a mobile device, such as a cell phone, smart phone, tablet computer, personal digital assistant (PDA), personal gaming device, or laptop computer, or a networking device, such as a router (wireless or wireline), mobile broadband modem, data over cable service interface specification (DOCSIS) modem, digital subscriber line (DSL) modem, fiber optic modem, a satellite modem paired with a satellite dish, or any combination thereof. The guest device 103 or host device 105 may include a consumer device, such as a gaming console, television, stereo, or the like. Further, the guest device 103 or host device 105 may refer to a communication device integrated within another device, including a vehicle. For example, a vehicle may include an integrated communication device that connects to a cellular or other wireless network. Similarly, a consumer device, such as a coffee maker, washing machine, or refrigerator, may include an integrated communication device that may connect, for example, to a cellular network or WiFi network. The guest device 103 or host device 105 may also refer to the device itself with the integrated communication device (e.g., the car or the refrigerator). Additionally, the host device 105 may include a computer or server with a mobile device or networking device incorporated within or with software that is capable of performing the function of a mobile device or a networking device (e.g., a software router).

The host device 105 or the guest device 103 may each be associated or linked with an account of a communication service provider 107 and a user that is responsible for the account with the communication service provider 107. It will be appreciated that the association may be pre-determined (e.g., the account owner is the owner of the guest device 103 or host device 105) or may arise concurrently or near concurrently with the service usage (e.g., the account owner logs onto a shared workstation serving as the guest device 103 or the host device 105 or the account owner identifies his or her self on a host's television set serving as the guest device 103 or the host device 105). An account with a communication service provider 107 may include a set allocation of units for a particular service. For example, an account may include an allocation of call minutes, number of text messages, or data bandwidth (e.g., the number of megabytes (MB) of data sent to or received from the host device 105 or guest device 103). An account may also include a rate for a particular service, instead of or in addition to an allocation of units. As examples, an account may have a rate for each minute of a phone call (e.g., $0.10 per minute), a rate for each text (e.g., $0.05 per text), a rate for each MB of bandwidth used (e.g., $0.25 per MB of data sent or received), or a rate for each pay-per-view movie played.

Conventionally, the service usage of a mobile device or a networking device may each be charged against an account of the communication service provider 107 associated with that device. For instance, a smart phone may be associated with an account with a cellular service provider. When the smart phone is used to make a phone call, the minutes of the phone call may be charged against the account with the cellular service provider that is associated with the smart phone. When the smart phone is used to browse the Internet or download a song with the smart phone, the bandwidth usage (e.g., the number of megabytes (MB) of data sent to or received from the smart phone) may be charged against the account. Similarly, a DSL modem may be associated with an account with an Internet service provider (ISP). When the DSL modem accesses the Internet, the data bandwidth usage incurred may be charged against the account associated with the DSL modem. In both the smart phone and DSL modem examples, the service usage charge may comprise a deduction from a set allocation of units (e.g., call minutes, text messages, or MB of data) or a monetary charge (e.g., based on a rate) which must be paid.

The communication service provider 107 may include a network entity. A network entity may include a collection of devices owned by, leased to, or otherwise recognized to be part of a telecommunication provider's network. The devices may function to provide a telecommunication service such as cellular service, Internet service, satellite phone service, or satellite Internet service. The devices may also function to provide media delivery, such as a movie, a show, or music under a pay-per-view or subscription model. A device may include the gateway 106, through which the host device 105 may connect to the communication service provider 107, or the account server 113. The functions of account server 113, account system 115, account database 117, and gateway 106 may be in a single device or distributed to more than one device.

The gateway 106 may include a device that provides access to the communication service provider 107. For example, where the host device 105 is a cellular device, the gateway 106 may include a base transceiver station (BTS), a base station controller (BSC), and a home subscriber server (HSS). The BTS, BSC, and HSS, along with other elements described further herein, may act in conjunction to authenticate the host device 105 and provide access to the communication service provider 107 (comprising a cellular service provider in this case). As another example, where the host device 105 is a router incorporating or connected to a DSL modem, the gateway 106 may include a digital subscriber line access multiplexer (DSLAM), which authenticates the DSL modem and allows the DSL modem access to the communication service provider 107. As yet another example, where the host device 105 is a router incorporating or connected to a DOCSIS modem, the gateway 106 may include a cable modem termination system (CMTS), which authenticates the DOCSIS modem and provides access to the communication service provider 107 for the DOCSIS modem.

A network to which the communication service provider 107 may be connected may include the Internet 109, the PSTN 110, or other type of network 111 (e.g., local area network (LAN), wide area network (WAN), or intranet), or a combination thereof. It will be appreciated that the Internet 109, the PSTN 110, and other networks 111 may be interconnected. For example, a device connected to the PSTN 110 may be able to access the Internet 109 via the connection with the PSTN 110.

The account server 113 may include a computing device, such as a server. An exemplary account server 113 may include a mainframe computer, a computer with a reduced instruction set computing (RISC) architecture, a computer with a complex instruction set computing (CISC) architecture, or a computer running a Unix (e.g. Advanced Interactive eXecutive (AIX), Berkeley Software Distribution (BSD), Solaris, Linux, Hewlett-Packard UniX (HP-UX)), Windows, or OS/390 operating system. The account server 113 may be a single device or may be comprised of multiple interconnected devices, such as a server cluster or a server with external peripherals (e.g., distributed storage server or database server).

The account server 113 may include an account system 115. The account system 115 may comprise a software system that maintains the accounts associated with the guest device 103 or the host device 105. The account server 113 may include an account database 117, which may interact with the account system 115. The account database 117 may store information on the accounts associated with the guest device 103 and the host device 105. Such information may include information on a user or owner of the guest device 103 or host device 105 (e.g., name, address, or phone number), a credential or identifier associated with an account (e.g., user id, password, or account number), or an identifier associated with the guest device 103 or the host device 105 (e.g., media access control (MAC) address, international mobile subscriber identity (IMSI), or phone number of the guest device 103 or host device 105). Account information stored in the account database 117 may also include information on an allocation of service units for an account or a rate for services for an account.

The account system 115 may interact with the gateway 106 to charge communication service usage provided by the communication service provider 107. For example, if a host device 105 accesses the Internet 109 through the communication service provider 107, the gateway 106 may communicate the data usage incurred by the host device 105 to the account system 115 on the account server 113. Conventionally, the account system 115 may then charge the incurred data usage of the host device 105 to the account associated with the host device 105.

The account system 115 may include a user interface in which information on an account may be viewed. Information on an account may include allocated service usage units, remaining service usage units, or rate. The user interface may also display usage details, such as details on a phone call (e.g., the number of minutes of the call, the start and stop times of the call, or the recipient or source of the call), details on a text message (e.g., the time of the text message or the recipient or source of the text message), or details on a data usage (e.g., the time of the data usage, the amount of data uploaded or downloaded, or the recipient or source of the data usage). As discussed further herein, the user interface may also present information on usage that was incurred while the host device 105 was serving as a host for the guest device 103 to access the communication service provider 107.

Figure 2:
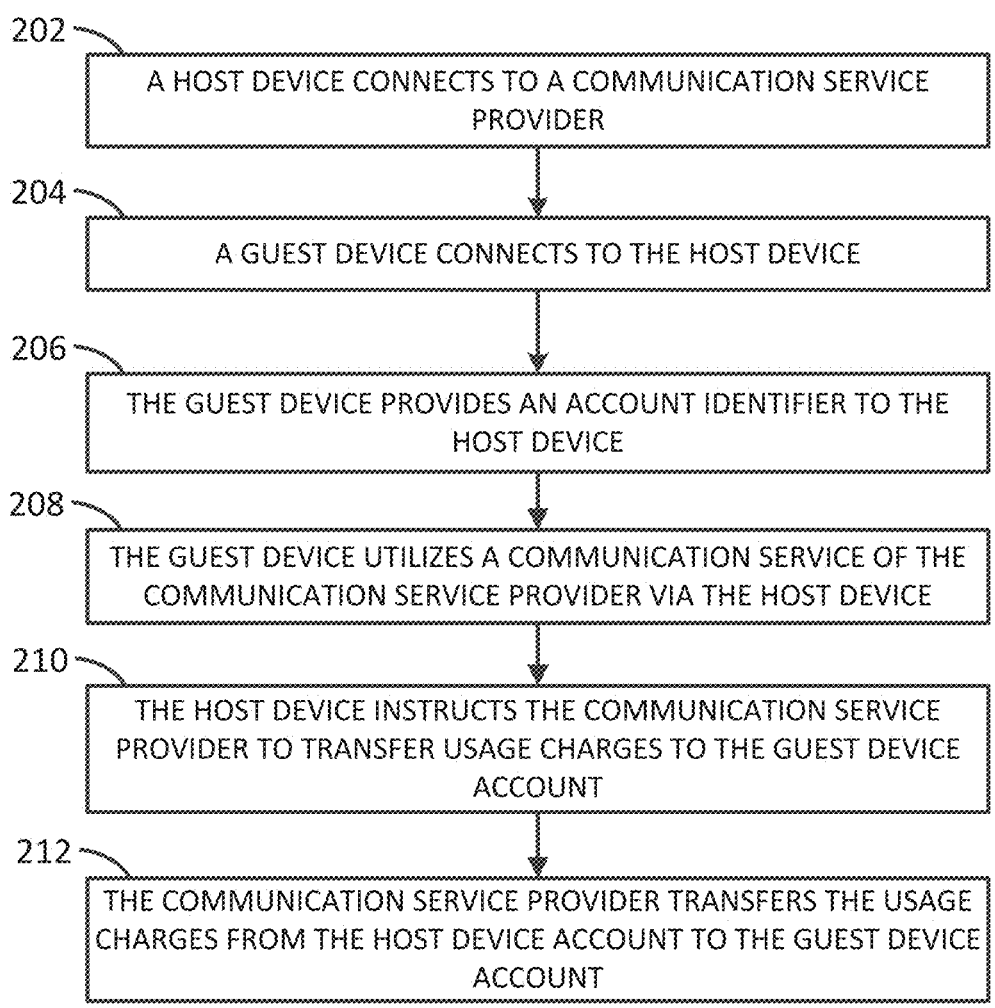
FIG. 2 illustrates an exemplary method for communication service usage transfer.

FIG. 2 illustrates an exemplary method 200 for communication service usage transfer.

At block 202, a host device 105 may connect to a communication service provider 107. A communication service provider 107 may provide access to a network, such as the PSTN 110, the Internet 109, or other network 111.

In connecting to the communication service provider 107, the host device 105 may connect to a gateway 106 of the communication service provider 107. For example and as discussed elsewhere herein, the gateway 106 of a cellular service provider may be comprised of a base transceiver station (BTS), a base station controller (BSC), and a home subscriber server (HSS). As another example, the gateway 106 of a communication service provider 107 that provides Internet service may include a digital subscriber line access multiplexer (DSLAM) or a cable modem termination system (CMTS). The host device 105 may connect to the gateway 106 over a wireless (e.g., radio wave) or wireline (e.g. fiber optic, ethernet, DSL, or cable television infrastructure) connection. The host device 105 may provide an identifier, such as a media access control (MAC) address or international mobile subscriber identity (IMSI), or user id and password, to the gateway 106 in order for the gateway 106, which may operate in conjunction with the account system 115, to allow the connection. Once the host device 105 is connected to the gateway 106 of the communication service provider 107, the host device 105 may then be free to access a network. For example, once the host device 105, such as a cellular mobile device, connects to the gateway 106, such as a BTS, the host device 105 may then place a call to another device with in the PSTN 110. It should be appreciated that the host device 105 may or may not use the services offered by the communication service provider 107 and the network (such as placing a call within PSTN 110 or browsing the Internet 109); the host device 105 may merely be connected to the gateway 106 and, thereby, the communication service provider 107.

At block 204, a guest device 103 may connect to the host device 105. The guest device 103 may connect to the host device 105 over, for example, a wireless interface or a wireline interface. A wireless interface may include a WiFi or Bluetooth connection. In connecting over WiFi or Bluetooth, a wireless ad hoc network (WANET) or mobile ad hoc network (MANET) may be formed. If the host device 105 is a mobile device, the host device 105 may operate as a mobile hotspot, thus acting as a wireless access point (WAP) and router for the guest device 103. A wireline interface may include a connection over a universal serial bus (USB) cable or an ethernet cable. As an illustration, the guest device 103, such as a smart phone, may connect over a Bluetooth connection to the mobile hotspot offered by the host device 105, such as another smart phone. As another illustration, the guest device 103, such as a tablet computer, may connect over a WiFi connection to the host device 105, such as a wireless router paired with a DSL modem. The guest device 103 may connect to the host device 105 based on limited connectivity of the guest device 103, no connectivity of the guest device 103, or relatively high-cost connectivity of the guest device 103, such as when a cellular mobile device is out of its normal service area (e.g., roaming). As another example, the guest device 103, such as a tablet computer having WiFi capability, but not cellular capability, may connect to the host device 105 that is capable of connecting to the communication service provider 107 over a cellular connection (e.g., where the host device 105 is a cellular mobile device) or a wired network connection (e.g., where the host device 105 is a wireless router paired with a modem). These are a few example instances in which the present disclosure may allow the guest device 103 access to a communication service which the guest device 103 might not otherwise have been able to access.

At block 206, the guest device 103 may provide an account identifier to the host device 105. The account identifier may identify the guest device 103 or the owner or user of the guest device 103 so that the account identifier may be cross-referenced in the account system 115 to identify the account in the account system 115 associated with the guest device 103 or the owner or user of the guest device 103. The account identifier may include a device identifier, such as a device ID number (e.g., an international mobile subscriber identity (IMSI) stored on the subscriber identity module (SIM) within the guest device 103). The device identifier may be included in the communication session or header information and may later be cross-referenced in the account system 115 to identify, for example, a mobile station international subscriber directory number (MSISDN) associated with the guest device 103. The account identifier may also be in the form of an account number, a user name (which may be paired with a password), a phone number, or any other means of linking the guest device 103 or guest device 103 with an associated account. Providing an account identifier may also include more advanced security features. For example, the guest device 103 may transmit a token to the host device 105 for the host device 105 to present to the guest device's 103 account system 115 or funding source. The token may be a value, such as a number, letter, or combination of numbers and letters, that, when presented, confirms authorization to access services or access information. The token may contain embedded and tamperproof limitations to protect against overbilling (e.g., a time interval, a total amount to transfer, the types of destination traffic to be transferred, and the like).

Figure 4:
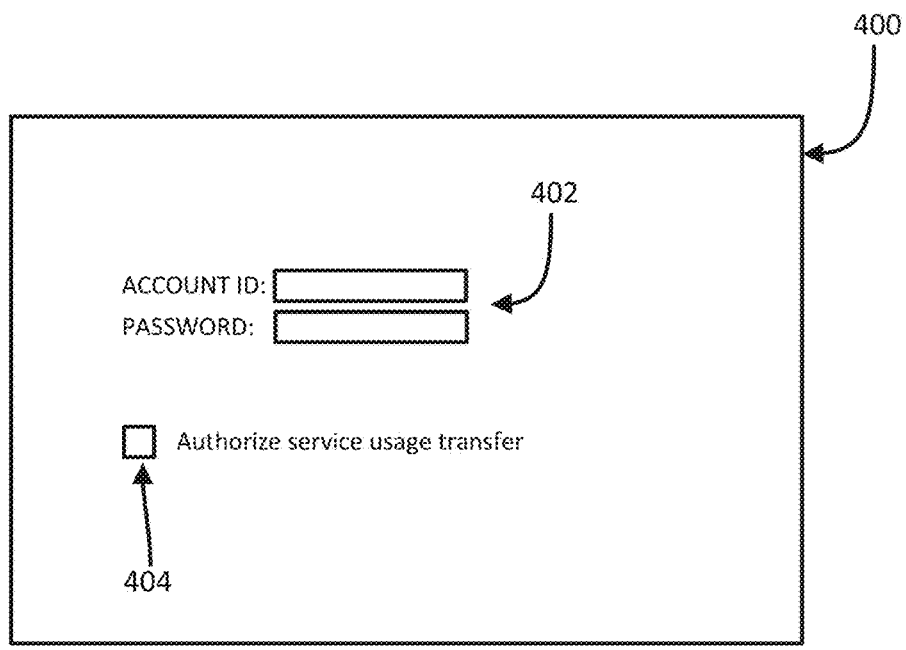
FIG. 4 illustrates an exemplary user interface which may be utilized to facilitate communication service usage transfer.

The provision of the account identifier by the guest device 103 to the host device 105 may occur automatically or may involve an input to the guest device 103 which is then provided by the guest device 103 to the host device 105. The provision of the account identifier may also be in response to a prompt from the host device 105. For example, after the guest device 103 connects to the host device 105, the host device 105 may provide or cause a user interface, such as a webpage, to be displayed on the guest device 103. A user interface may also be provided using a protocol, such as session initiation protocol (SIP), to exchange structured data that the guest device 103 may then interpret and present upon the guest device 103. Referring to FIG. 4, the user interface 400 displayed on the guest device 103 may display a selectable option 404 to authorize the guest device's 103 usage of a communication service to be charged to the guest device 103 account. The user interface 400 may include an input field 402 in which an account identifier may be collected. In this example, the input field 402 includes a space to enter an account ID and password.

Such a prompt may be performed upon the guest device 103 connecting to the host device 105, upon the guest device 103 hitting a threshold usage level, or may not occur until the guest device 103 attempts to use a communication service through the host device 105 (and thus incur a usage charge which would ordinarily be charged against the account associated with the host device 105). For example, if a guest device 103 attempts to use a web browser to access the Internet 109, the web browser may be redirected to a webpage in which an account identifier may be input. A prompt for the authorization that the service usage incurred may be charged to the guest device 103 account may also include a conditional authorization. For example, the transfer of service usage charges may only take effect if the guest device 103 incurs more than a pre-specified amount of service usage (e.g., no service usage will be transferred for up to 10 MB of data usage, but service usage beyond 10 MB of data usage will be transferred). As another example, it may be authorized that the transfer of service usage charges may only take effect if the host device 105 account includes service usage charges above a pre-specified threshold. To illustrate, the transfer may only take effect if the host device 105 account exceeded a monthly allocation of data usage.

In another example, the host device 105 may provide a selectable option for the authorization of an arrangement or provide a choice of arrangements in which the guest device 103 may use a communication service through the host device 105 for a pre-specified period of time and during which all service usage charges would be transferred to the guest device 103 account. An arrangement may also include where the guest device 103 may use a communication service through the host device 105 for a pre-specified period of time and a pre-specified flat fee (e.g., $10.00) or pre-specified amount of usage (e.g., 15 minutes of phone call time or 10 MB of data usage) will be transferred to the guest device 103 account. An arrangement may also include where the guest device 103 may use a communication service through the host device 105 for up to a pre-specified amount of usage. For example, the guest device 103 may use up to 25 MB of data usage. The pre-specified amount of service usage will then be transferred to the guest device 103 account, whether or not the guest device 103 actually consumes the pre-specified amount of service usage.

In another example, the guest device 103 may provide the account information associated with the guest device 103 to the communication service provider 107. This may occur automatically, for example, by virtue of the communication service provider 107 being aware of devices connected to the communication service provider 107, even those connected via an intermediate device (e.g., the host device 105).

At block 208, the guest device 103 may utilize a communication service of the communication service provider 107 via the host device 105. Recalling that the host device 105 is connected to the communication service provider 107 and that the guest device 103 is connected to the host device 105, the host device 105 may allow the guest device 103 to utilize a communication service through the host device 105. For example, using mobile hotspot technology, the host device 105, such as a smart phone, may allow the connected guest device 103, such as a tablet computer, to take advantage of the host device's 105 connection to browse the Internet 109 through the communication service provider 107. As another example, the host device 105, such as a wireless router paired with a DSL modem, may allow a connected guest device 103, such as a smart phone, access to the Internet 109, via the communication service provider 107, so that the guest device 103 may stream a video from the Internet 109. In the absence of the present disclosure, the usage for the services used by the guest device 103 via the host device 105 would be charged to the host device 105 account, even though the ultimate destination of, for example, downloaded data or a text message is the guest device 103.

While the guest device 103 is using the communication services through the host device 105, the host device 105 may log information on the guest device's 103 service usage. For example, such information may include the start and stop time of the usage, the number of minutes of a phone call, or the amount of data downloaded or uploaded. The communication service provider 107, such as the gateway 106 or the account system 115, may also log similar information on the service usage. It will be appreciated by one skilled in the art that exact (e.g., per byte) logging of service usage may be difficult to achieve. Accordingly, service usage may be approximated or rounded up or down to the nearest service usage unit (e.g., MB of data usage).

When the guest device 103 completes its service usage session, the host device 105 may provide an end-of-session service usage transfer acknowledgement which may contain information on the service usage logged by the host device 105 and which the host device 105 plans to transmit to the account system 115 for transfer. This may afford an opportunity for the guest device 103 or the guest device 103 user to compare the host device's 105 logged service usage information with service usage information for the session logged by the guest device 103. The end-of-session service usage transfer acknowledgement may be in the form of a user interface, such as a webpage, which the host device 105 causes to be displayed on the guest device 103, or in the form of raw service usage data (e.g., number of MB of data usage). Further, the guest device 103 may automatically compare the service usage information logged by and transmitted from the host device 105 against service usage information logged by the guest device 103. If the two service usages reflected in the two sets of service usage information are different or differ by a pre-specified threshold (e.g., percent difference or absolute difference), a message or warning may be generated on the guest device 103. Conversely, the guest device 103 may transmit service usage information logged on the guest device 103 to the host device 105 so that the host device 105 may compare the host device's 105 logged service usage information against that from the guest device 103. If the host device 105 detects a difference or difference beyond a pre-specified threshold, the host device 105 may cause a message to display on the host device 105 communicating the discrepancy. In addition, if the host device 105 detects a discrepancy, it may transmit to or cause to display a user interface or message on the guest device 103 that communicates the discrepancy. In a similar fashion, the communication service provider 107 may log service usage information pertaining to the service usage of the guest device 103 facilitated by the host device 105. In turn, when the service usage session ends, either by volition of the guest device 103, the host device 105, or the communication service provider 107, the communication service provider 107 may transmit an end-of-session service usage transfer acknowledgement, including service usage information, to the host device 105 which may then be transmitted to the guest device 103. The guest device 103 may compare the communication service provider 107 service usage data with its own logged data and provide a message, as described herein.

At block 210, the host device 105 may instruct the communication service provider 107 to transfer service usage charges incurred by the guest device's 103 service usage via the host device 105 to the guest device 103 account. The host device 105 may perform the instruction to transfer the service usage charges by communicating information, such as the account identifier provided by the guest device 103 in block 206 and the logged information on the guest device's 103 usage, to the account system 115. The account system 115 may then use the account identifier to identify an account associated with the guest device 103. The identification may be performed by cross-referencing the account identifier in the account database 117.

Figure 6:
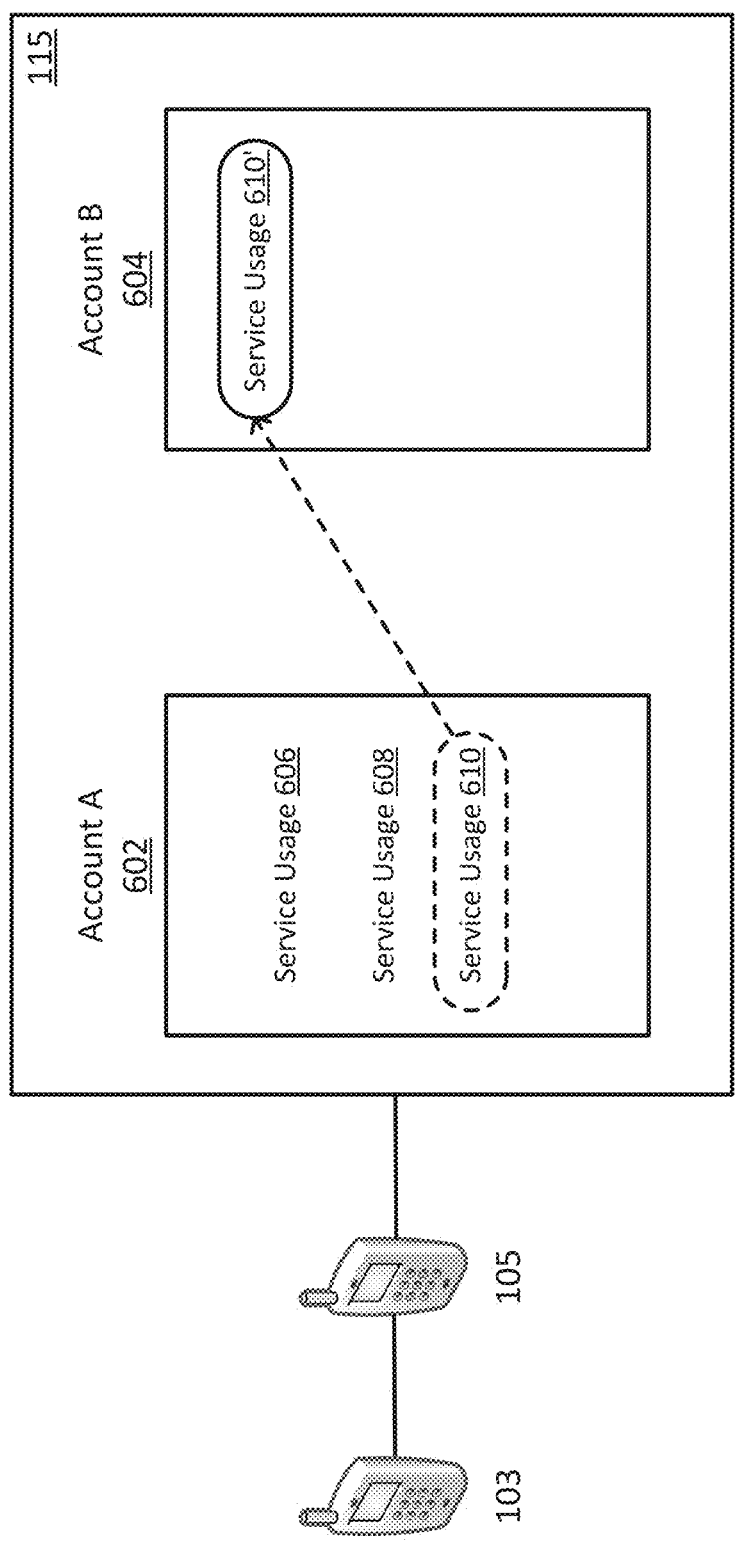
FIG. 6 is a block diagram of an example account system in which aspects of the communication service usage transfer may be facilitated.

FIG. 6 provides an exemplary illustration of the account system 115 with the host device 105 connected. The account system 115 includes a host device 105 account, depicted as account A 602, and a guest device 103 account, depicted as account B 604. Account A 602 may include one or more service usage charges, depicted in FIG. 6 as service usage 606, service usage 608, and service usage 610. The host device 105 may communicate to the account system 115 an account identifier identifying the guest device 103 account as account B 604. The host device 105 may also communicate logged information on the guest device's 103 service usage, which may identify the service usage 610 (shown in a dotted circle) in account A 602 as the guest device's 103 service usage. The service usage 610 may be flagged or labeled to identify it as a service usage that is eligible to be transferred. A service usage charge, such as service usage 610, may also exist in the account system 115 as a anticipatory service usage charge (e.g., it is a service usage charge that is not yet charged to the account but will be after some pre-specified period of time if the service usage charge is not transferred).

It should be appreciated that a user associated with the host device 105 may also perform the instruction to transfer service usage charges, such as via a user interface which is part of the account system 115. As an illustration, if the guest device 103 had provided an account number as the account identifier and downloaded 10 MB of data through the host device 105, the host device 105 user may log in to a user interface of the account system 115 and provide the account number and the 10 MB of data service usage to the account system 115 and instruct the account system 115 to charge the 10 MB of data service usage to the account associated with the account number.

The host device 105 may perform the instruction to transfer the service usage charges automatically at the time the service usage charges are incurred. Alternatively, the host device 105 may instruct the account system 115 to transfer the service usage charges at a later, pre-specified period of time, such as at the end of a billing cycle. The information pertaining to the service usage may be communicated to the account system 115 at the time of service usage or also at a later pre-specified period of time. For example, a user associated with the host device 105 may view his or her account, via a user interface of the account system 115, for a billing period in which a guest device 103 had incurred a service usage charge against the host device 105 account. The host device 105 user may see that he or she exceeded his or her service usage allocation for the billing period. At that point, the user may instruct the account system 115 to transfer the service usage charge incurred by the guest device 103 to the guest device 103 account.

At block 212, the account system 115 of the communication service provider 107 may transfer the service usage charges incurred in block 208 from the account associated with the host device 105 to the account associated with the guest device 103.

Referring again to FIG. 6, the account system 115 may transfer the service usage charge identified in block 210 (e.g., service usage 610) to the guest device 103 account identified in block 210 (e.g., account B 604). The transfer is represented in FIG. 6 by the dotted arrow and the transferred location in account B 604 of the service usage 610 is shown as service usage 610'. The account system 115 may perform the transfer of service usage charges by crediting account A 602 with the service usage 610 and deducting the service usage 610' from the account B 604. For example, if the service usage 610 is 10 MB of data, account A 602 has 800 MB of data remaining in its allocation of data charges, and account B 604 has 1000 MB of data remaining in its allocation of data charges, the account system 115 would credit account A 602 with 10 MB of data charges (leaving it with 810 MB) and deduct the 10 MB of data charges from account B 604 (leaving it with 990 MB). This example assumes that the service usage 610 has already been charged against account A 602. In another example, a service usage charge may not yet be charged against account A 602, but may merely be pending. In this case, the account system 115 would cancel the pending service usage charge against account A 602 and then deduct the service usage charge from account B 604.

Continuing to reference FIG. 6, if account A 602 or account B 604 include a rate for a service (e.g., $0.10 per MB of data usage) instead of an allocation of service usage units, the account system 115 may multiply the service usage charge of block 208 by the rate for that service and then credit and deduct or charge the resulting amount from the host device 105 account and the guest device 103 account, respectively.

In one example, the account system 115 may automatically transfer the service usage charge from the host device 105 account to the guest device 103 account. The account system 115 may automatically perform the transfer based on a setting or rule. The setting or rule may be previously provided or set by the user of the host device 105. The setting or rule may relate to threshold amount of service usage available, service usage already consumed, or rate. For example, at a previous time, the host device 105 user may use a user interface of the account system 115 to specify that all service usage charges incurred by all guest devices 103 that may be connected to the host device 105 are to be automatically transferred to the guest device 103 account. The host device 105 user may also specify that if a certain percentage or more of an allocated service usage is consumed (e.g., more than 50% of an allocated 1000 MB of data usage), then the account system 115 is to automatically transfer service usage charges incurred by guest devices 103 to the guest device 103 account. Similarly, the guest device 103 user may use a user interface of the account system 115 to provide a setting or rule pertaining to the service usage charges incurred by the guest device 103 while connected to the host device 105. For example, the guest device 103 user may specify that all service usage charges should be transferred to the guest device 103 account. The guest device 103 user may specify a rule that service usage charges should only be transferred if a service usage allocation in the guest device 103 account has exceeded a certain threshold. Or the guest device 103 user may specify a rule that service usage charges should only be transferred if a service usage allocation in the host device 105 account has exceeded a certain threshold.

Figure 3:
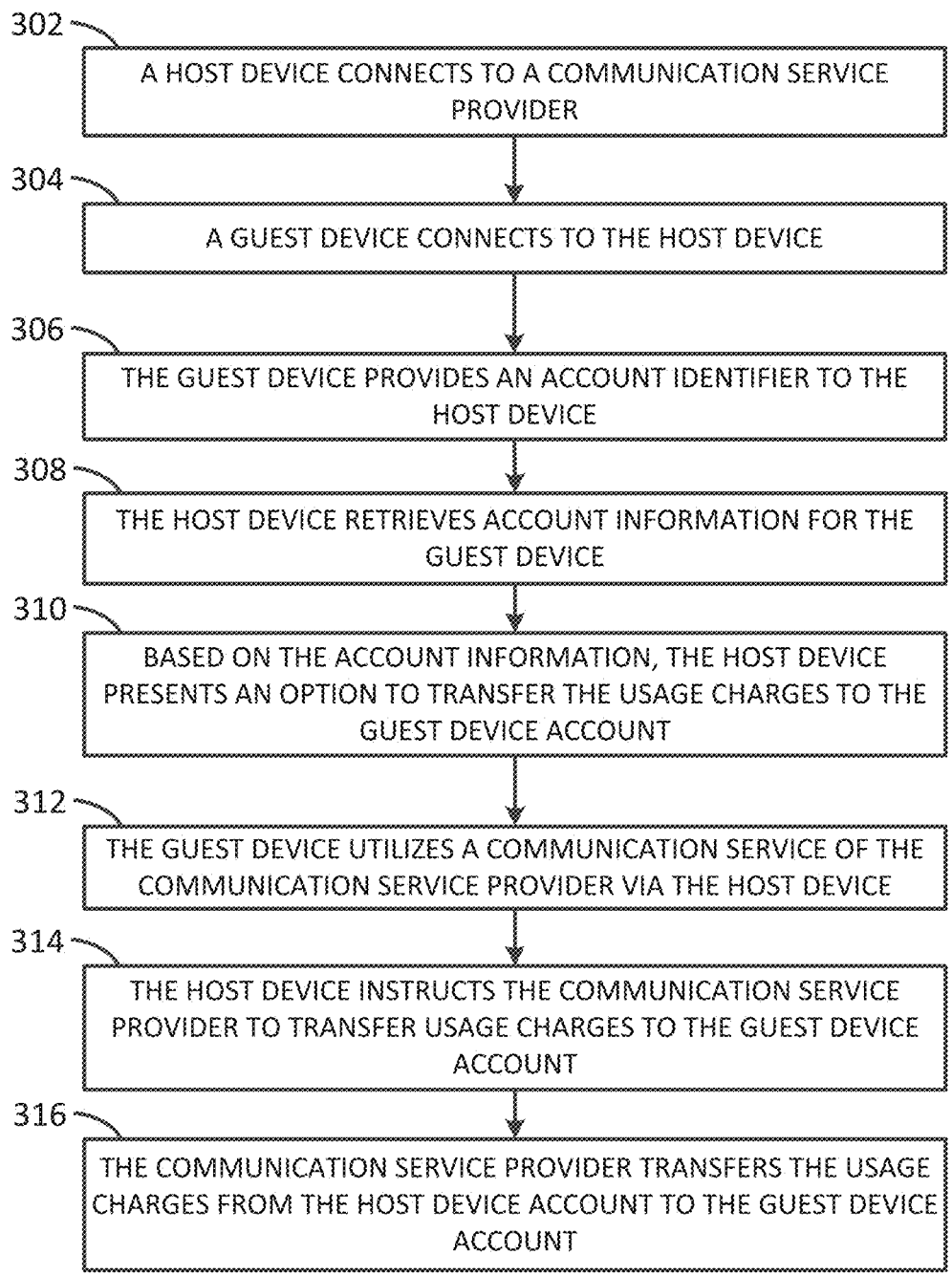
FIG. 3 illustrates an exemplary method for communication service usage transfer.

FIG. 3 illustrates an exemplary method 200 for communication service usage transfer. At block 302, a host device 105 may connect to a communication service provider 107, such as via a gateway 106. At block 304, a guest device 103 may connect to the host device 105, such as via a Bluetooth or WiFi connection. At block 306, the guest device 103 may provide an account identifier, such as an account number or international mobile subscriber identity (IMSI), to the host device 105.

At block 308, the host device 105 may retrieve account information associated with the guest device 103. For example, the host device 105 may communicate with an account system 115 associated with the guest device 103 and provide the account identifier for the guest device 103. The account system 115 may retrieve account information on the guest device 103 account by cross-referencing the provided account identifier and communicate the account information back to the host device 105. Account information may include a rate for services ordinarily used by the guest device 103 (e.g., phone calls are billed at $0.10 per minute, data usage is billed at $0.25 per MB). Account information may also include information on service usage allocations, such as the total units allocated, units consumed, and units remaining. For examples, the account information may indicate that the guest device 103 account is allocated 100 MB of data usage per billing period and has 50 MB of data usage remaining for the current billing period. The account information may also include a combination of the aforementioned examples such that the account information indicates an allocation of service usage allocation and also a billing rate for service usage beyond that allocation.

Figure 5:
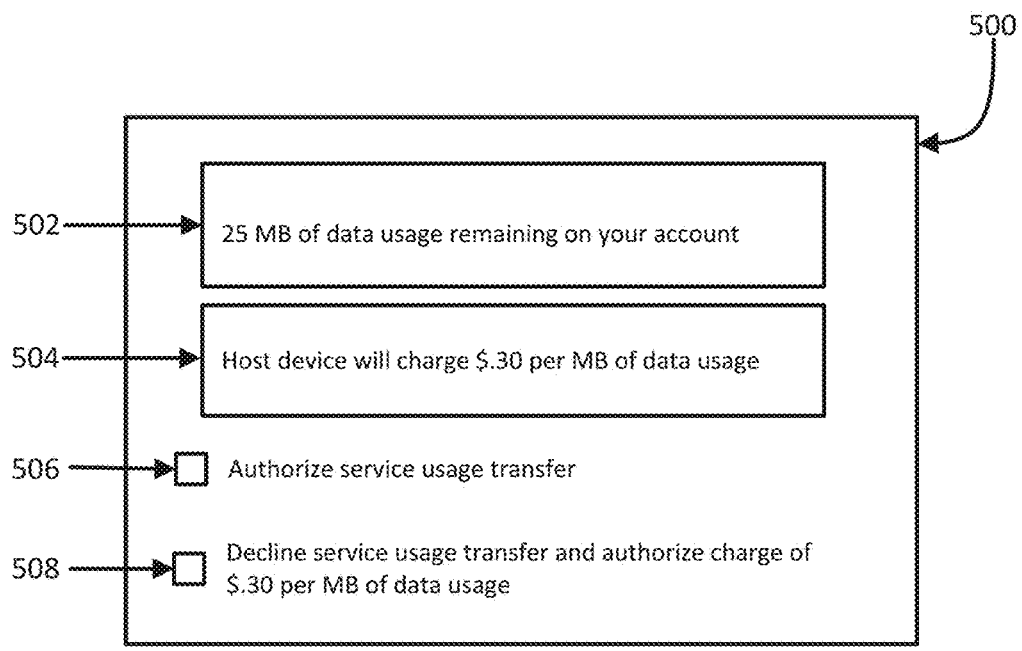
FIG. 5 illustrates an exemplary user interface which may be utilized to facilitate communication service usage transfer.

At block 310, the host device 105 may present an option, based on the account information of the guest device 103, to transfer service usage charges to the guest device 103 account. Referring to FIG. 5, the host device 105 may cause a user interface (shown as user interface 500) to be presented on the guest device 103. The user interface 500 may display information about the guest device 103 account (shown as account information 502), such as a service billing rate from the guest device 103 account or an amount of service usage remaining of a service usage allocation for the billing period. The user interface 500 may also display one or more conditions for an option of not transferring service usage charges to the guest device 103 account (shown as condition 504). For instance, if service usage charges are not transferred, then a fee to a person or entity associated with the host device 105 may have to be paid. Such a fee may include a one-time fee, a per-service-usage-unit fee, or a fee for a pre-specified period of time. The user interface 500 may provide a selectable option (shown as option 506) to authorize the service usage charges incurred by the guest device 103 to be transferred to the guest device 103 account. The user interface 500 may provide a selectable option (shown as option 508) to decline the service usage charge transfer and authorize the condition 504. By displaying billing and usage information from the guest device 103 account and an alternative billing option for not transferring service usage charges, the user interface 500 may allow an informed decision to be made to most efficiently use a communication service.

As an illustration, the user interface 500 on the guest device 103 may show that the guest device 103 account would be charged $0.25 per MB of data usage and that if an election was not made to transfer the service usage charge for a contemplated file download, a fee at a rate of $0.35 per MB of data usage would have to be paid to the host device 105 owner. In this case, an election would likely be made on the user interface 500 to transfer the service usage charge to the guest device 103 account since it would be cheaper. As another illustration, the user interface 500 may show that the guest device 103 account has only 5 MB of data usage remaining of the billing period allocation and that an overage would result in a $10 penalty and charge at the rate of $1 per MB. The user interface 500 may also show that if an election was not made to transfer the service usage charge, a flat $5 fee would have to be paid to the host device 105 owner. Since it likely would be desirable to avoid the larger overage penalty and per-MB rate on the guest device 103 account, an election to decline the option to transfer changes to the guest device 103 account and instead pay the fee to the host device 105 owner would be likely. In another example, the guest device 103 may show on user interface 500 a likelihood (e.g., 90%, "very likely", etc.) of an overage charge (e.g., $0, $0.10, $1.00, etc.) or any other charge based on a past usage of bandwidth associated with host device 105. For instance, host device 105 may allow connections from multiple devices that are associated with different accounts. The host device 105, itself, may be charged a flat rate for a threshold bandwidth usage and additional charges for amounts over the threshold bandwidth usage. The likelihood may be determined based on the historical bandwidth usage of the host device 105 alone or in combination with the guest device 103, or other devices or associated accounts. The likelihood may be continuously updated and displayed on the user interface 500 over the course of the session by the guest device 103.

At block 312, the guest device 103 may utilize a communication service of the communication service provider 107 via the host device 105, such as browsing the Internet 109. At block 314, if transfer is elected in block 310, the host device 105 may instruct the communication service provider 107 to transfer the service usage charge, such as that incurred in block 312, to the guest device 103 account. If transfer is declined in block 310, then the host device 105 or a person or entity associated with the host device 105 may impose a fee upon the guest device 103 for the service usage charge incurred. In block 316, the communication service provider 107 may transfer the service usage charge from the host device 105 account to the guest device 103 account.

Figure 7:
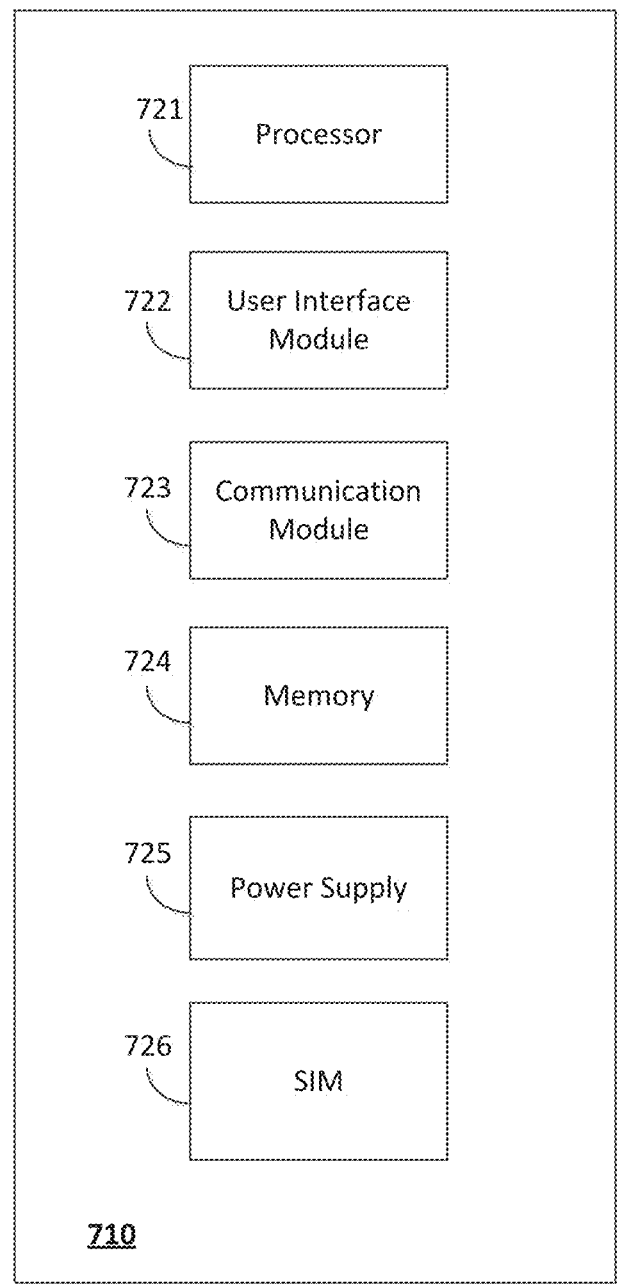
FIG. 7 is a block diagram of an example device via which aspects of communication service usage transfer may be facilitated.

FIG. 7 illustrates an example wireless device 710 (e.g., WTRU) that may be used in connection with communication service usage transfer. References will also be made to other figures of the present disclosure as appropriate. For example, the guest device 103 and the host device 105 may include a wireless device of the type described in regard to FIG. 7, and may have some, all, or none of the components and modules described in regard to FIG. 7. It will be appreciated that the components and modules of wireless device 710 illustrated in FIG. 7 are illustrative, and that any number and type of components and/or modules may be present in wireless device 710. In addition, the functions performed by any or all of the components and modules illustrated in FIG. 7 may be performed by any number of physical components. Thus, it is possible that in some configurations the functionality of more than one component and/or module illustrated in FIG. 7 may be performed by any number or types of hardware or hardware and software.

Processor 721 may be any type of circuitry that performs operations on behalf of wireless device 710. Such circuitry may include circuitry and other components that enable processor 721 to perform any of the functions and methods described herein. Such circuitry and other components may also enable processor 721 to communicate and/or interact with other devices and components, for example any other component of wireless device 710, in such a manner as to enable the guest device 103 and the host device 105 and such other devices and/or components to perform any of the disclosed functions and methods. In an example configuration, processor 721 executes software (e.g., computer readable instructions stored in a computer readable medium) that may include functionality related to communication service usage transfer, for example. User interface module 722 may be any type or combination of hardware and software that enables a user to operate and interact with wireless device 710, and, in an example configuration, to interact with a system enabling the user to place, request, and/or receive calls, text communications of any type, voicemail, voicemail notifications, voicemail content and/or data, and/or a system. For example, user interface module 722 may include a display, physical and/or "soft" keys, voice recognition software, a microphone, a speaker and the like. Wireless communication module 723 may be any type of transceiver including any combination of hardware and software that enables wireless device 710 to communicate with wireless network equipment. Memory 724 enables wireless device 710 to store information, such as an alert or information associated with a region. Memory 724 may take any form, such as internal random access memory (RAM), an SD card, a microSD card and the like. Power supply 725 may be a battery or other type of power input (e.g., a charging cable that is connected to an electrical outlet, etc.) that is capable of powering wireless device 710. SIM 726 may be any type Subscriber Identity Module (SIM) and may be configured on a removable or non-removable SIM card that allows wireless device 710 to store data on SIM 726.

Figure 8:
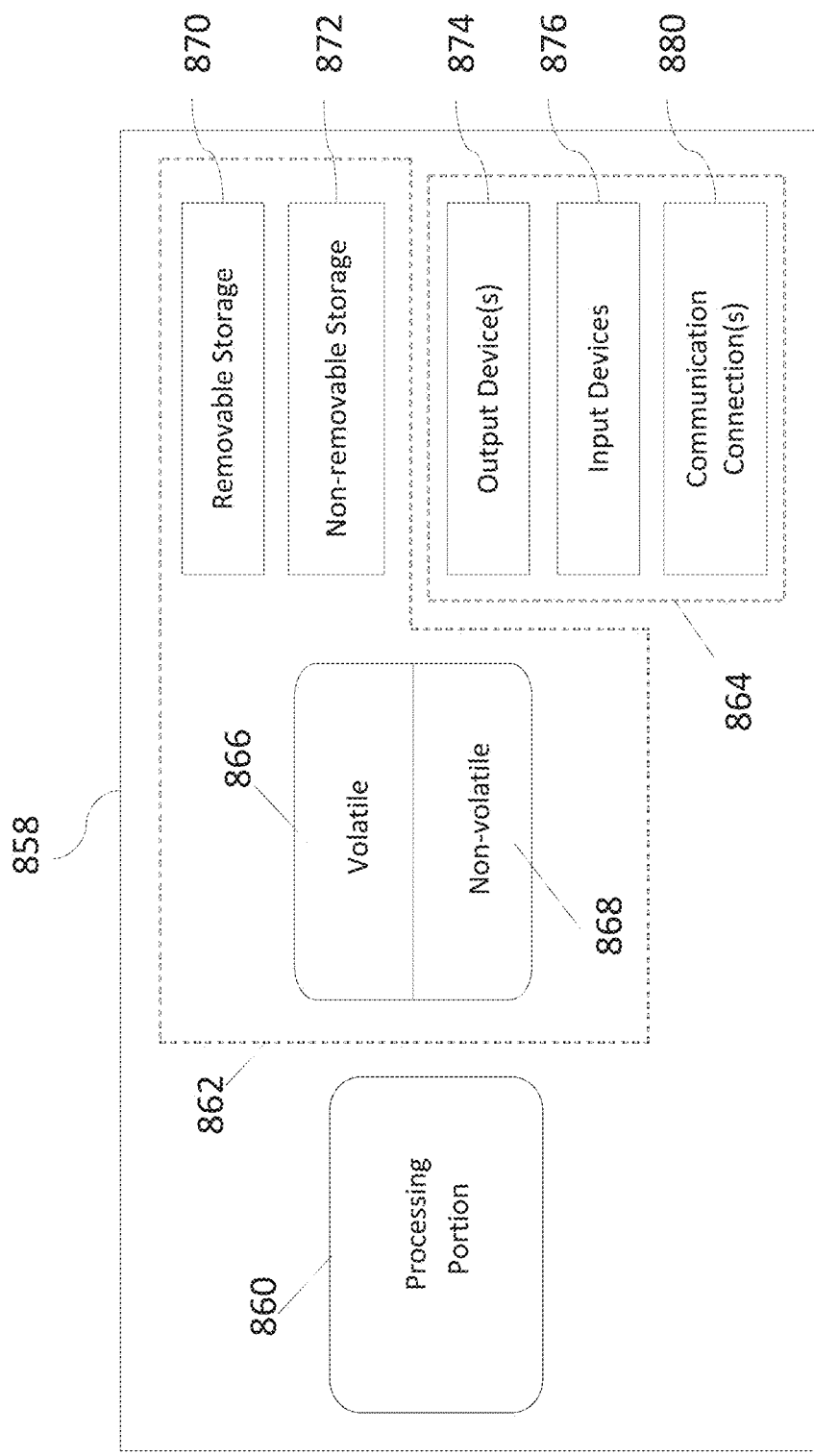
FIG. 8 is a block diagram of an example processor via which aspects of communication service usage transfer may be facilitated.

FIG. 8 is a block diagram of an example processor 858 in which communication service usage transfer may be implemented. Processor 858 may be employed in any of the examples described herein, including as one or more components of the guest device 103, the host device 105, the gateway 106, the communication service provider 107, the account server 113, the account system 115, the account database 117, and/or as one or more components of any third party system or subsystem that may implement any portion of the subject matter described herein. It is emphasized that the block diagram depicted in FIG. 8 is exemplary and not intended to imply a specific implementation. Thus, the processor 858 may be implemented in a single processor or multiple processors. Multiple processors may be distributed or centrally located. Multiple processors may communicate wirelessly, via hard wire, or a combination thereof. Processor 858 may include circuitry and other components that enable processor 858 to perform any of the functions and methods described herein. Such circuitry and other components may also enable processor 858 to communicate and/or interact with other devices and components, for example any other component of any device disclosed herein or any other device, in such a manner as to enable processor 858 and such other devices and/or components to perform any of the disclosed functions and methods.

As depicted in FIG. 8, the processor 858 comprises a processing portion 860, a memory portion 862, and an input/output portion 864. The processing portion 860, memory portion 862, and input/output portion 864 are coupled together (coupling not shown in FIG. 8) to allow communications between these portions. The input/output portion 864 is capable of providing and/or receiving components, commands, and/or instructions, utilized to, for example, establish and terminate communications sessions, transmit and receive service requests and data access request data and responses, transmit, receive, store and process text, data, and voice communications, execute software that efficiently receives and processes media requests, transmit media, and/or perform any other function described herein.

The processor 858 may be implemented as a client processor and/or a server processor. In a basic configuration, the processor 858 may include at least one processing portion 860 and memory portion 862. The memory portion 862 may store any information utilized in conjunction with establishing, transmitting, receiving, and/or processing text, data, media, and/or voice communications, communications-related data and/or content, voice calls, other telephonic communications, etc. For example, the memory portion is capable of storing media content, such as video media files, audio media files, and text media files. Depending upon the exact configuration and type of processor 858, the memory portion 862 may be volatile (such as RAM) 866, non-volatile (such as ROM, flash memory, etc.) 868, or a combination thereof. The processor 858 may have additional features/functionality. For example, the processor 858 may include additional storage (removable storage 870 and/or non-removable storage 872) including, but not limited to, magnetic or optical disks, tape, flash, smart cards or a combination thereof. Computer storage media, such as memory and storage elements 862, 870, 872, 866, and 868, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the processor 858. Any such computer storage media may be part of the processor 858 and is not a transient signal.

The processor 858 may also contain the communications connection(s) 880 that allow the processor 858 to communicate with other devices, for example through a radio access network (RAN). Communications connection(s) 880 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media, wherein storage media is not a transient or propagated signal. A computer-readable storage medium, as described herein is an article of manufacture having a concrete, tangible, physical structure, and thus, not to be construed as a propagating signal. Any computer-readable storage medium described herein is not to be construed as a signal. Any computer-readable storage medium described herein is to be construed as an article of manufacture having a concrete, tangible, physical structure. The processor 858 also may have input device(s) 876 such as keyboard, keypad, mouse, pen, voice input device, video input device, touch input device, etc. Output device(s) 874 such as a display, speakers, printer, etc. also may be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how communication service usage transfer may be implemented with stationary and non-stationary network structures and architectures in order to enable communication service usage transfer. It can be appreciated, however, that communication service usage transfer as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1 Evolution Data Optimized (EVDO), Code Division Multiple Access-2000 (cdma2000 3), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, communication service usage transfer may be applied independently of the method of data transport and does not depend on any particular network architecture or underlying protocols.

Figure 9:
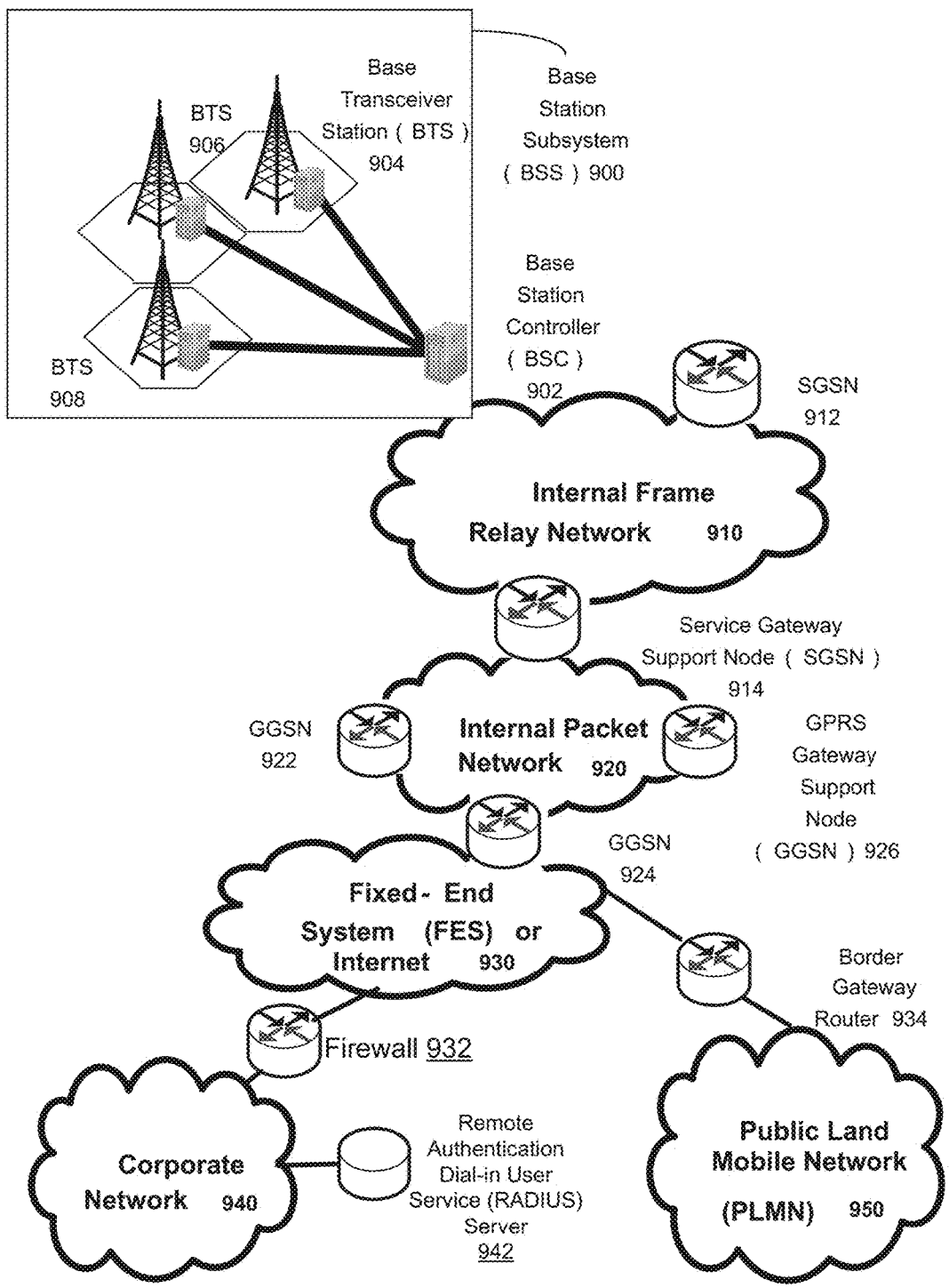
FIG. 9 is a block diagram of a non-limiting exemplary packet-based mobile cellular network environment, such as a GPRS network, which may be utilized to facilitate communication service usage transfer.

FIG. 9 depicts an overall block diagram of an exemplary packet-based mobile cellular network environment, such as a GPRS network, in which apparatuses, systems, and methods for communication service usage transfer such as those described herein may be practiced. In an example configuration, any RAN as described herein may be encompassed by or interact with the network environment depicted in FIG. 9. Similarly, wireless-enabled devices, such as the guest device 103 or the host device 105 may communicate or interact with a network environment such as that depicted in FIG. 9. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., the guest device 103 or the host device 105) become connected to the wireless network. In exemplary fashion, the packet traffic originating from user devices (e.g., the guest device 103 or the host device 105) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 10:
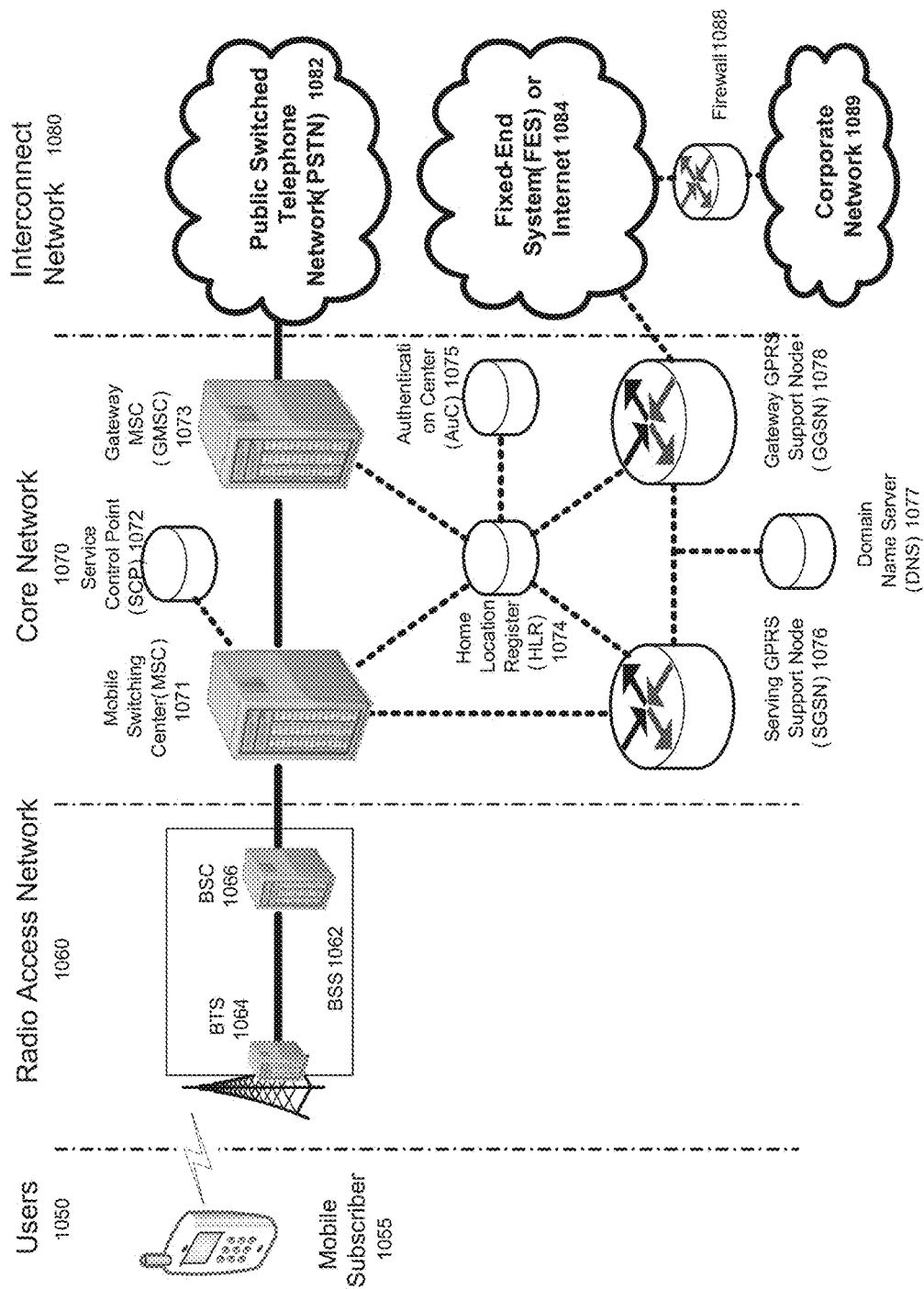
FIG. 10 illustrates a non-limiting exemplary architecture of a typical GPRS network, segmented into four groups, which may be utilized to communication service usage transfer.

FIG. 10 illustrates an example architecture of a GPRS network in which one or more disclosed examples of communication service usage transfer may be implemented. The GPRS network depicted in FIG. 10 comprises four groups: users 1050, radio access network 1060, core network 1070, and interconnect network 1080. Users 1050 may comprise a plurality of end users (though only mobile subscriber 1055 is shown in FIG. 10). In an example, the device depicted as mobile subscriber 1055 may comprise any of the guest device 103 or the host device 105. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 10, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some examples, HLR 1074 may be a device such as HSSs. HLR 1074 may store static information about the subscribers such as the International Mobile Subscriber Identity (IMSI), APN profiles as described herein, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as the guest device 103 or the host device 105, used by an end user of a mobile cellular service or a wireless provider. When a mobile subscriber turns on his or her mobile device, the mobile device may go through an attach process by which the mobile device attaches to an SGSN of the GPRS network. In FIG. 10, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN.

The DNS query may be sent to the DNS server within the core network 1070, such as DNS 1077, which may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of apparatuses, systems, and methods for communication service usage transfer such as those described herein may include, but are not limited to, Gateway GPRS Support Node tables, Fixed End System router tables, firewall systems, VPN tunnels, and any number of other network elements as required by the particular digital network.

Figure 11:
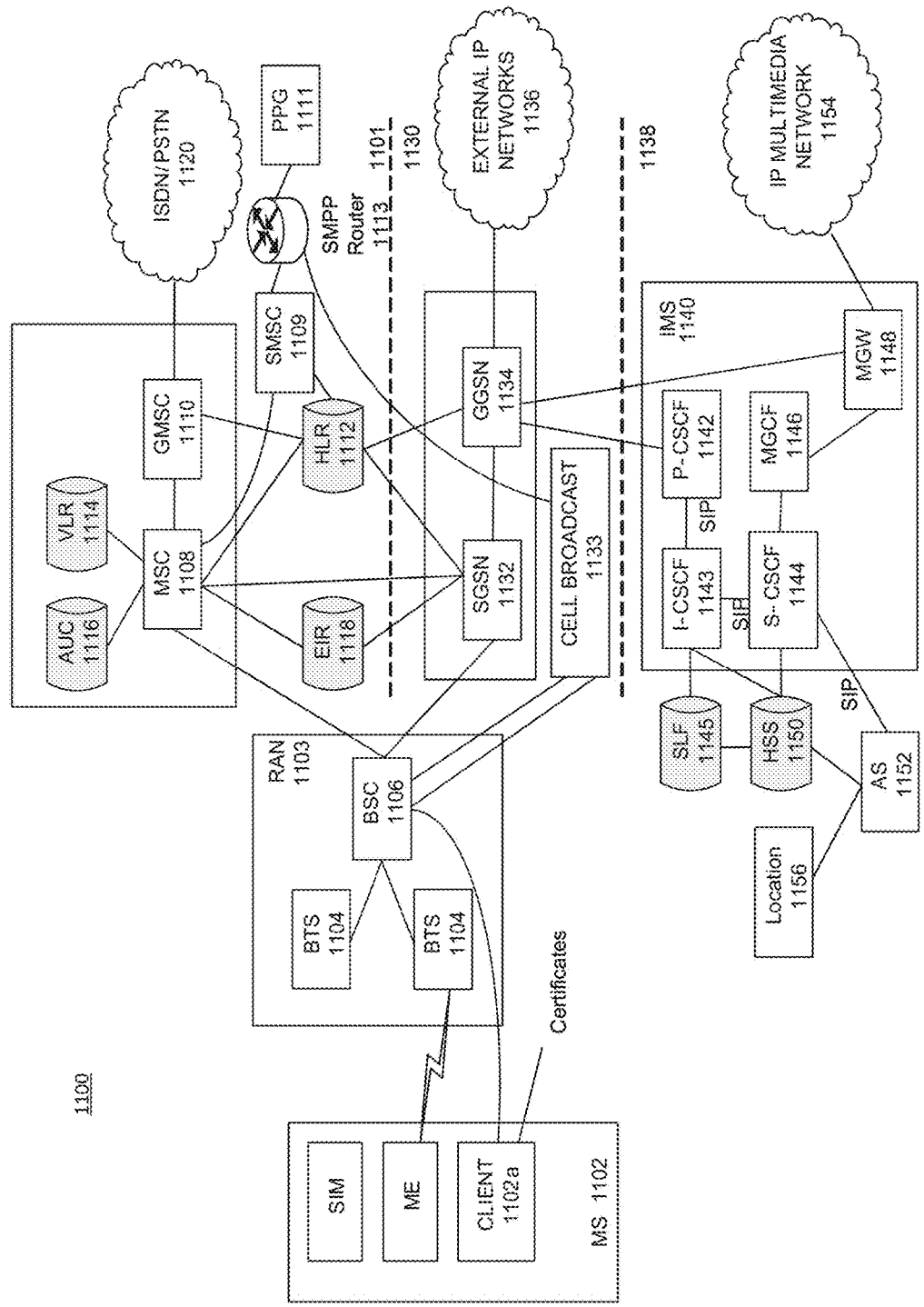
FIG. 11 illustrates a non-limiting alternate block diagram of an exemplary GSM/GPRS/IP multimedia network architecture which may be utilized to facilitate communication service usage transfer.

FIG. 11 illustrates another exemplary block diagram view of a GSM/GPRS/IP multimedia network architecture 1100 in which the apparatuses, systems, and methods for communication service usage transfer such as those described herein may be incorporated. As illustrated, architecture 1100 of FIG. 11 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., the guest device 103 or the host device 105) that is used by mobile subscribers, in one example with a Subscriber Identity Module (SIM). The SIM includes an International Mobile Subscriber Identity (IMSI), which is a unique identifier of a subscriber. The SIM may also include APNs. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (e.g., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138. HSS 1150 may include multiple HSSs.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

Figure 12:
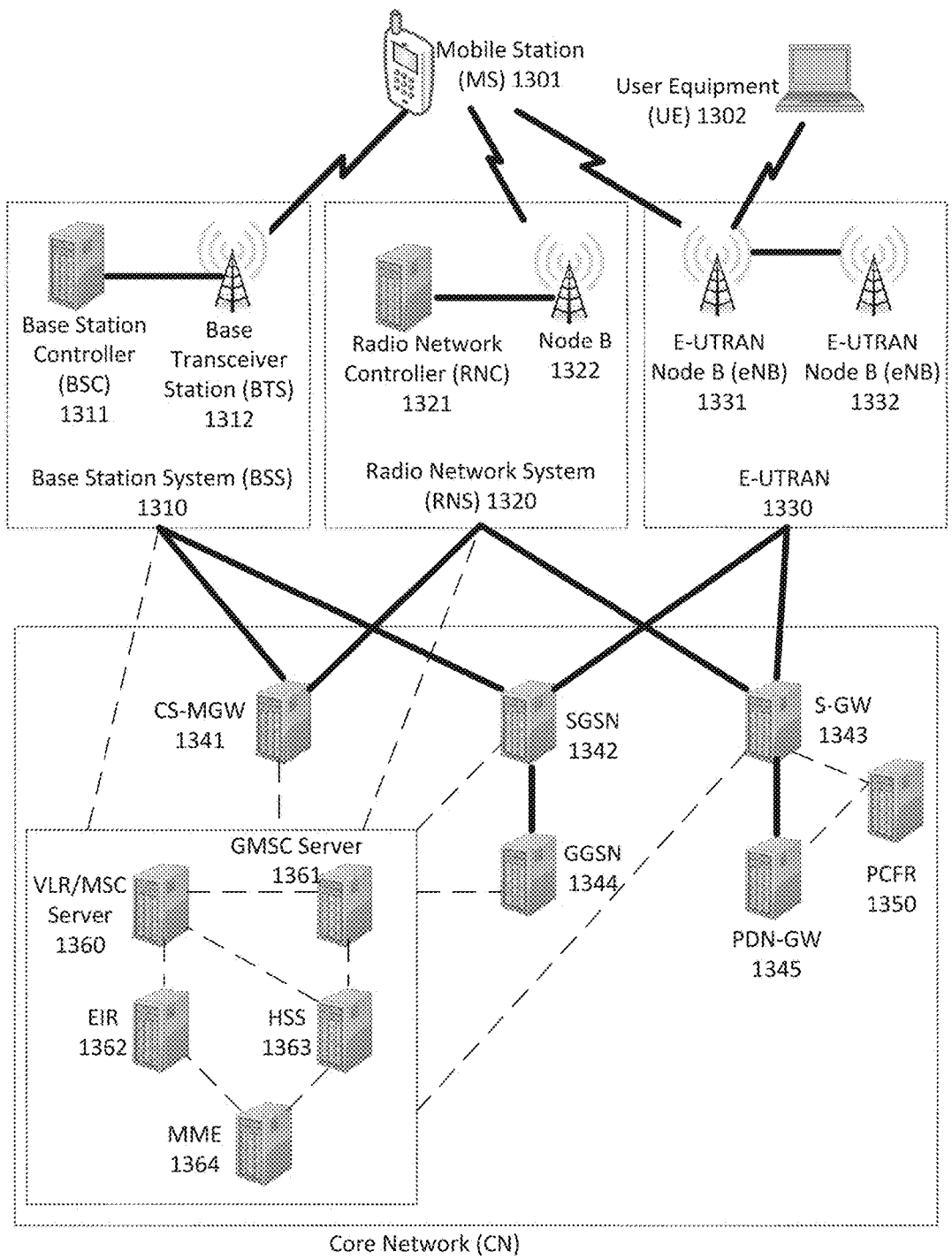
FIG. 12 illustrates a Public Land Mobile Network (PLMN) block diagram view of an exemplary architecture which may be utilized to facilitate communication service usage transfer.

FIG. 12 illustrates a PLMN block diagram view of an exemplary architecture in which communication service usage transfer may be incorporated. Mobile Station (MS) 1301 is the physical equipment used by the PLMN subscriber. In one illustrative example, the guest device 103 or the host device 105 may serve as Mobile Station 1301. Mobile Station 1301 may be one of, but not limited to, a cellular telephone, a cellular telephone in combination with another electronic device or any other wireless mobile communication device.

Mobile Station 1301 may communicate wirelessly with Base Station System (BSS) 1310. BSS 1310 contains a Base Station Controller (BSC) 1311 and a Base Transceiver Station (BTS) 1312. BSS 1310 may include a single BSC 1311/BTS 1312 pair (Base Station) or a system of BSC/BTS pairs which are part of a larger network. BSS 1310 is responsible for communicating with Mobile Station 1301 and may support one or more cells. BSS 1310 is responsible for handling cellular traffic and signaling between Mobile Station 1301 and Core Network 1340. Typically, BSS 1310 performs functions that include, but are not limited to, digital conversion of speech channels, allocation of channels to mobile devices, paging, and transmission/reception of cellular signals.

Additionally, Mobile Station 1301 may communicate wirelessly with Radio Network System (RNS) 1320. RNS 1320 contains a Radio Network Controller (RNC) 1321 and one or more Node(s) B 1322. RNS 1320 may support one or more cells. RNS 1320 may also include one or more RNC 1321/Node B 1322 pairs or alternatively a single RNC 1321 may manage multiple Nodes B 1322. RNS 1320 is responsible for communicating with Mobile Station 1301 in its geographically defined area. RNC 1321 is responsible for controlling the Node(s) B 1322 that are connected to it and is a control element in a UMTS radio access network. RNC 1321 performs functions such as, but not limited to, load control, packet scheduling, handover control, security functions, as well as controlling Mobile Station 1301's access to the Core Network (CN) 1340.

The evolved UMTS Terrestrial Radio Access Network (E-UTRAN) 1330 is a radio access network that provides wireless data communications for Mobile Station 1301 and User Equipment 1302. E-UTRAN 1330 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1330 may include of series of logical network components such as E-UTRAN Node B (eNB) 1331 and E-UTRAN Node B (eNB) 1332. E-UTRAN 1330 may contain one or more eNBs. User Equipment 1302 may be any user device capable of connecting to E-UTRAN 1330 including, but not limited to, a personal computer, laptop, mobile device, wireless router, or other device capable of wireless connectivity to E-UTRAN 1330. The improved performance of the E-UTRAN 1330 relative to a typical UMTS network allows for increased bandwidth, spectral efficiency, and functionality including, but not limited to, voice, high-speed applications, large data transfer and IPTV, while still allowing for full mobility.

An exemplary mobile data and communication service that may be implemented in the PLMN architecture described in FIG. 12 is the Enhanced Data rates for GSM Evolution (EDGE). EDGE is an enhancement for GPRS networks that implements an improved signal modulation scheme known as 9-P SK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1301 may communicate with any or all of BSS 1310, RNS 1320, or E-UTRAN 1330. In an illustrative system, each of BSS 1310, RNS 1320, and E-UTRAN 1330 may provide Mobile Station 1301 with access to Core Network 1340. The Core Network 1340 may include of a series of devices that route data and communications between end users. Core Network 1340 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1341 is part of Core Network 1340, and interacts with Visitor Location Register (VLR) and Mobile-Services Switching Center (MSC) Server 1360 and Gateway MSC Server 1361 in order to facilitate Core Network 1340 resource control in the CS domain. Functions of CS-MGW 1341 include, but are not limited to, media conversion, bearer control, payload processing and other mobile network processing such as handover or anchoring. CS-MGW 1340 may receive connections to Mobile Station 1301 through BSS 1310, RNS 1320 or both.

Serving GPRS Support Node (SGSN) 1342 stores subscriber data regarding Mobile Station 1301 in order to facilitate network functionality. SGSN 1342 may store subscription information such as, but not limited to, the International Mobile Subscriber Identity (IMSI), temporary identities, or Packet Data Protocol (PDP) addresses. SGSN 1342 may also store location information such as, but not limited to, the Gateway GPRS Support Node (GGSN) 1344 address for each GGSN where an active PDP exists. GGSN 1344 may implement a location register function to store subscriber data it receives from SGSN 1342 such as subscription or location information.

Serving Gateway (S-GW) 1343 is an interface which provides connectivity between E-UTRAN 1330 and Core Network 1340. Functions of S-GW 1343 include, but are not limited to, packet routing, packet forwarding, transport level packet processing, event reporting to Policy and Charging Rules Function (PCRF) 1350, and mobility anchoring for inter-network mobility. PCRF 1350 uses information gathered from S-GW 1343, as well as other sources, to make applicable policy and charging decisions related to data flows, network resources and other network administration functions. Packet Data Network Gateway (PDN-GW) 1345 may provide user-to-services connectivity functionality including, but not limited to, network-wide mobility anchoring, bearer session anchoring and control, and IP address allocation for PS domain connections.

Home Subscriber Server (HSS) 1363 is a database for user information, and stores subscription data regarding Mobile Station 1301 or User Equipment 1302 for handling calls or data sessions. Networks may contain one HSS 1363 or more if additional resources are required. Exemplary data stored by HSS 1363 include, but is not limited to, user identification, numbering and addressing information, security information, or location information. HSS 1363 may also provide call or session establishment procedures in both the PS and CS domains.

The VLR/MSC Server 1360 provides user location functionality. When Mobile Station 1301 enters a new network location, it begins a registration procedure. A MSC Server for that location transfers the location information to the VLR for the area. A VLR and MSC Server may be located in the same computing environment, as is shown by VLR/MSC Server 1360, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1301 registration or procedures for handover of Mobile Station 1301 to a different section of the Core Network 1340. GMSC Server 1361 may serve as a connection to alternate GMSC Servers for other mobile stations in larger networks.

Equipment Identity Register (EIR) 1362 is a logical element which may store the International Mobile Equipment Identities (IMEI) for Mobile Station 1301. In a typical example, user equipment may be classified as either "white listed" or "black listed" depending on its status in the network. In one example, if Mobile Station 1301 is stolen and put to use by an unauthorized user, it may be registered as "black listed" in EIR 1362, preventing its use on the network. Mobility Management Entity (MME) 1364 is a control node which may track Mobile Station 1301 or User Equipment 1302 if the devices are idle. Additional functionality may include the ability of MME 1364 to contact an idle Mobile Station 1301 or User Equipment 1302 if retransmission of a previous session is required.

While communication service usage transfer has been described in connection with the various examples of the various figures, it is to be understood that other similar examples may be used or modifications and additions may be made to the described examples for performing the same function of communication service usage transfer without deviating therefrom. For example, one skilled in the art will recognize that communication service usage transfer as described in the present application may apply to any environment, whether wired or wireless, and may be applied to any number of such devices connected via a communications network and interacting across the network. Therefore, communication service usage transfer should not be limited to any single example, but rather should be construed in breadth and scope in accordance with the appended claims.

What is claimed:

1. A host device comprising:
   a processor, the processor configured to communicate with and be incorporated into the host device; and
   a memory coupled to the processor, the memory having stored thereon executable instructions that when executed by the processor cause the processor to effectuate operations comprising:
      connecting with a network entity, the host device associated with a first account associated with the network entity;
      connecting with a guest device, the guest device associated with a second account associated with the network entity;
      facilitating communication from the guest device to the network entity, the facilitated communication from the guest device to the network entity comprising incurring an amount of data usage against the first account and flagging communications from the guest device to the network entity as a service usage that is eligible for transferring the incurred amount of data usage against the first account to the second account; and
      when the first account exceeds a service data usage allocation for a billing period based on the facilitating of the communication, providing an instruction to the network entity to facilitate the transfer of the incurred amount of data usage against the first account to the second account.

2. The device of claim 1, wherein the operations further comprise;
   receiving a credential from the guest device, the credential identifying the second account associated with the guest device; and
   providing the credential to the network entity.

3. The device of claim 2, wherein:
   the host device comprises a first mobile device; and
   the guest device comprises a second mobile device.

4. The device of claim 1, wherein the providing the instruction to the network entity to facilitate the transfer of the incurred amount of data usage against the first account to the second account is further based on a pre-specified period of time.

5. The device of claim 1, wherein the operations further comprise:
   responsive to facilitating communication from the guest device to the network entity, preventing communication from the guest device to the network entity; and
   responsive to preventing communication from the guest device to the network entity, providing information on the facilitated communication to the guest device.

6. The device of claim 1, wherein the operations further comprise:
   providing to the guest device a user interface, the user interface displaying a selectable option that if selected will authorize the device to provide the instruction to the network entity to facilitate the transfer of the incurred amount of data usage against the first account to the second account; and
   receiving from the guest device an indication of the authorization to provide the instruction to the network entity to facilitate the transfer of the incurred amount of data usage against the first account to the second account.

7. The device of claim 6, wherein the user interface comprises a webpage.

8. A system comprising:
   a host device; and
   a network entity communicatively connected with the host device, the network entity comprising:
      a processor, the processor configured to communicate with and be incorporated into the network entity;
      a memory coupled to the processor, the memory having stored thereon executable instructions that when executed by the processor cause the processor to effectuate operations comprising:
         receiving a request for a connection, the request being indicative of being provided by the host device, the host device being associated with a first account associated with the network entity;
         receiving an account identifier from the first device, the account identifier associated with a guest device connected to the first device, the guest device associated with a second account associated with the network entity;
         providing a communication service to the guest device, the communication service facilitated by the first device and comprising incurring an amount of data usage against the first account;
         flagging communications from the guest device to the network entity as a service usage that is eligible for transferring the incurred amount of data usage against the first account to the second account; and
         when the first account exceeds a service data usage allocation for a billing period based on the providing of the communication service to the guest device, facilitating the transfer of the incurred amount of data usage against the first account to the second account.

9. The system of claim 8, wherein:
   the first device comprises a first mobile device; and
   the guest device comprises a second mobile device.

10. The system of claim 8, wherein the facilitating the transfer of the incurred amount of data usage against the first account to the second account is responsive to receiving an instruction from the first device to facilitate the transfer of the incurred amount of data usage against the first account to the second account.

11. The system of claim 8, wherein facilitating the transfer of the incurred amount of data usage against the first account to the second account is further based on a pre-specified period of time.

12. The system of claim 8, wherein the operations further comprise:
responsive to providing the communication service to the guest device, preventing the communication service to the guest device; and
responsive to preventing the communication service to the guest device, providing information on the communication service to the guest device.

13. The system of claim 8, wherein the operations further comprise:
providing to the guest device a user interface, the user interface displaying a selectable option that if selected will provide an authorization for the network entity to facilitate the transfer of the incurred amount of data usage against the first account to the second account; and
receiving an indication of the authorization for the network entity to facilitate the transfer of the incurred amount of data usage against the first account to the second account.

14. The system of claim 13, wherein the user interface comprises a webpage.

15. A method comprising:
receiving, by a network entity, a request for a connection to the network entity, the request being indicative of being provided by a first device, the first device being associated with a first account associated with the network entity;
receiving, by the network entity, an account identifier from the first device, the account identifier associated with a guest device connected to the first device, the guest device associated with a second account associated with the network entity;
providing, by the network entity, a communication service to the guest device, the communication service facilitated by the first device and comprising incurring an amount of data usage against the first account;
flagging communications from the guest device to the network entity as a service usage that is eligible for transferring the incurred amount of data usage against the first account to the second account; and
when the first account exceeds a service data usage allocation for a billing period based on the providing of the communication service to the guest device, facilitating, by the network entity, the transfer of the incurred amount of data usage against the first account to the second account.

16. The method of claim 15, wherein:
the first device comprises a first mobile device; and
the guest device comprises a second mobile device.

17. The method of claim 15, wherein the facilitating, by the network entity, the transfer of the incurred amount of data usage against the first account to the second account is further based on a pre-specified period of time.

18. The method of claim 15, further comprising:
responsive to providing, by the network entity, the communication service to the guest device, preventing, by the network entity, the communication service to the guest device; and
responsive to preventing, by the network entity, the communication service to the guest device, providing, by the network entity, information on the communication service to the guest device.

19. The method of claim 15, further comprising:
providing, by the network entity, to the guest device a user interface, the user interface displaying a selectable option that if selected will provide an authorization for the network entity to facilitate the transfer of the incurred amount of data usage against the first account to the second account; and
receiving, by the network entity, an indication of the authorization for the network entity to facilitate the transfer of the incurred amount of data usage against the first account to the second account.

20. The method of claim 19, wherein the user interface comprises a webpage.

* * * * *